US012415096B2

(12) United States Patent
Chen et al.

(10) Patent No.: US 12,415,096 B2
(45) Date of Patent: Sep. 16, 2025

(54) ADAPTIVE AUXILIARY AIR SUPPLY RESPIRATOR AND CONTROL METHOD THEREOF

(71) Applicant: CCHANGZHOU SHINE SCIENCE & TECHNOLOGY CO. LTD., Changzhou (CN)

(72) Inventors: Liang Chen, Changzhou (CN); Dong Liang, Changzhou (CN); Hongjun Zhao, Changzhou (CN)

(73) Assignee: CHANGZHOU SHINE SCIENCE & TECHNOLOGY CO.LTD., Changzhou (CN)

( * ) Notice: Subject to any disclaimer, the term of this patent is extended or adjusted under 35 U.S.C. 154(b) by 0 days.

(21) Appl. No.: 19/028,904

(22) Filed: Jan. 17, 2025

(65) Prior Publication Data

US 2025/0222284 A1 Jul. 10, 2025

Related U.S. Application Data

(63) Continuation of application No. PCT/CN2024/134795, filed on Nov. 27, 2024.

(30) Foreign Application Priority Data

Jan. 4, 2024 (CN) ......................... 202410008686.2

(51) Int. Cl.
*A62B 9/02* (2006.01)
*A62B 7/10* (2006.01)
(Continued)

(52) U.S. Cl.
CPC ................ *A62B 9/022* (2013.01); *A62B 7/10* (2013.01); *A62B 18/006* (2013.01); *A62B 18/025* (2013.01)

(58) Field of Classification Search
CPC ..... A62B 18/006; A62B 18/02; A62B 18/025; A62B 18/04; A62B 18/045; A62B 18/08;
(Continued)

(56) References Cited

U.S. PATENT DOCUMENTS

2016/0271429 A1* 9/2016 Hanaoka ................ A62B 18/10
2018/0078798 A1* 3/2018 Fabian ................... A62B 18/10
2020/0038614 A1* 2/2020 Duff ...................... A61M 16/06

FOREIGN PATENT DOCUMENTS

CN 109475762 A 3/2019
CN 110891652 A 3/2020
(Continued)

OTHER PUBLICATIONS

English Machine Translation of CN-111481851-A provided by PE2E (Year: 2020).*

*Primary Examiner* — Kendra D Carter
*Assistant Examiner* — Brian T Khong
(74) *Attorney, Agent, or Firm* — George D. Morgan

(57) ABSTRACT

The invention relates to respirator technology, in particular to an adaptive auxiliary air supply respirator and a control method thereof. The respirator comprises: a sealing face shield covering the area of the mouth and nose, an internal chamber being formed within the sealing face shield; an exhalation valve connected to the sealing face shield, communicating with the internal chamber, and configured to open unidirectionally during exhalation; an intake chamber located inside the sealing face shield and equipped with an inhalation valve which opens unidirectionally during inhalation; a filter mounted on the sealing face shield and communicating with the intake chamber; and an auxiliary air supply mechanism comprising a fan extending into the intake chamber, a controller for controlling a speed of the fan, and a sensor arranged inside the sealing face shield. The (Continued)

fan draws external air, accelerating during inhalation and decelerating during exhalation, improving user experience.

2 Claims, 12 Drawing Sheets

(51) Int. Cl.
*A62B 18/00* (2006.01)
*A62B 18/02* (2006.01)

(58) Field of Classification Search
CPC ........... A62B 18/10; A62B 23/02; A62B 7/10; A62B 9/02; A62B 9/022; A62B 9/027; A62B 9/04
See application file for complete search history.

(56) References Cited

FOREIGN PATENT DOCUMENTS

| | | | | |
|---|---|---|---|---|
| CN | 111481851 | A | * | 8/2020 |
| CN | 114558259 | A | | 5/2022 |

* cited by examiner

ADAPTIVE AUXILIARY AIR SUPPLY RESPIRATOR AND CONTROL METHOD THEREOF

CROSS-REFERENCE TO RELATED APPLICATIONS

The application claims priority to Chinese patent application No. 2024100086862, filed on Jan. 4, 2024, the entire contents of which are incorporated herein by reference.

TECHNICAL FIELD

The invention relates to the technical field of respirators, in particular to an adaptive auxiliary air supply respirator and a control method thereof.

BACKGROUND

The respirator is a type of protective equipment primarily used to guard against oxygen deficiency and prevent the inhalation of harmful substances such as toxic materials and particulate matter. Existing respirators mainly include powered air-purifying respirators and non-powered air-purifying respirators.

For example, the Chinese utility model patent with publication number CN205460545U, filed on Aug. 17, 2016, discloses a portable air-purifying respirator that connects purified air to a face shield via an air purifier and an air duct. Another example is the Chinese utility model patent with publication number CN211935234U, filed on Nov. 17, 2020, which discloses a non-powered air-purifying respirator that fits a face shield closely to the face of a user, featuring a removable filter layer located between a first housing and a second housing on the face shield, allowing for the filtration of inhaled air.

However, the inventors have identified certain drawbacks in both the powered air-purifying respirators and the non-powered air-purifying respirators. For instance, the powered air-purifying respirators can cause discomfort due to prolonged airflow on the face of users, while the non-powered air-purifying respirators present a high breathing resistance, leading to fatigue when worn for extended periods.

SUMMARY

In light of at least one of the technical problems mentioned above, the invention provides an adaptive auxiliary air supply respirator and a control method thereof, employing structural improvements to enhance user comfort during use.

According to a first aspect of the invention, an adaptive auxiliary air supply respirator is provided, comprising:

- a sealing face shield covering at least the area of the mouth and nose, an internal chamber being formed within the sealing face shield;
- an exhalation valve connected to the sealing face shield, communicating with the internal chamber, and configured to open unidirectionally during exhalation, allowing gas from the internal chamber to be discharged through the exhalation valve;
- an intake chamber located inside the sealing face shield and equipped with an inhalation valve which opens unidirectionally during inhalation, allowing gas in the intake chamber to enter the internal chamber from the inhalation valve;

- a filter mounted on the sealing face shield and communicating with the intake chamber; and
- an auxiliary air supply mechanism comprising a fan extending into the intake chamber, a controller for controlling a speed of the fan, and a sensor arranged inside the sealing face shield;
- Here, the fan is configured to transfer external air into the intake chamber; when the sensor detects inhalation, the controller increases the speed of the fan; and when the sensor detects exhalation, the controller decreases the speed of the fan.

In some embodiments of the invention, the exhalation valve is positioned at a bottom of the sealing face shield and provided with a first valve flap inside which opens when the pressure exceeds a set value.

In some embodiments of the invention, the intake chamber is arranged in the middle of the sealing face shield, with a guiding surface on an outer wall of the intake chamber directed towards the exhalation valve.

In some embodiments of the invention, the intake chamber comprises a front chamber and a rear chamber, with the fan located inside the rear chamber, the rear chamber features an annular tapered wall protruding towards the front chamber, blades of the fan are positioned within the annular tapered wall, and the annular tapered wall communicates with the front chamber.

In some embodiments of the invention, the filter comprises a filtering plate located outside the sealing face shield and a communication tube communicating with the filtering plate and the front chamber.

In some embodiments of the invention, the inhalation valve is arranged at a top of the rear chamber and comprises a second valve flap with the center fixed and edges free.

In some embodiments of the invention, a height of the second valve flap corresponds to an inhalation area where the nostrils of the user are located.

In some embodiments of the invention, the sealing face shield is also equipped with a sound transmission membrane.

In some embodiments of the invention, the sensor is a pressure sensor, and the controller adjusts the speed of the fan based on the pressure changes monitored by the sensor.

According to a second aspect of the invention, a control method of the adaptive auxiliary air supply respirator is further provided, comprising the following steps:

- collecting values from the pressure sensor within the internal chamber;
- when a pressure value monitored by the pressure sensor is less than a set threshold range, controlling, by the controller, the fan to accelerate to maintain the pressure in the internal chamber within the set threshold range;
- when the pressure value monitored by the pressure sensor is greater than the set threshold range, controlling, by the controller, the fan to decelerate to lower the pressure in the internal chamber to within the set threshold range; and
- synchronously recording the frequency of changes in the pressure sensor, entering a synchronized air supply mode when a difference in the detected frequency change falls within a set range, which comprises setting a simulated frequency and controlling the fan to accelerate and decelerate in turn at the simulated frequency, and exiting the synchronized air supply mode when the difference in the detected frequency change exceeds the set range.

The beneficial effects of the invention are as follows. By arranging the exhalation valve within the internal chamber and the inhalation valve on the intake chamber within the internal chamber, as well as the sensor, the controller and the fan, the fan accelerates during inhalation, allowing external air to enter the intake chamber through the filter. Compared to the prior art, this design eliminates the need for continuous airflow while reducing the resistance to external air entering the sealing face shield, thereby decreasing user fatigue and enhancing the user experience.

BRIEF DESCRIPTION OF DRAWINGS

In order to more clearly explain the embodiments of the invention or the technical scheme in the prior art, the following will briefly introduce the drawings needed in the description of the embodiments or the prior art. Obviously, the drawings in the following description are only some embodiments of the invention. For those of ordinary skill in the art, other drawings can be obtained according to the provided drawings without paying creative labor.

DETAILED DESCRIPTION OF THE EMBODIMENTS

The technical schemes in the embodiments of the present invention are clearly and completely described in the following with reference to the drawings in the embodiments of the present invention. It is obvious that the described embodiments are only some of the embodiments of the present invention and are not all the embodiments thereof.

It should be noted that when an element is described as being "fixed to" another element, it may be directly on another element or there may be an intermediate element. When an element is considered to be "connected" to another element, it may be directly connected to another element or there may be an intermediate element. The terms "vertical", "horizontal", "left", "right" and similar expressions used herein are for the purpose of illustration only, and are not meant to be the only implementation way.

Unless otherwise defined, all technical terms and scientific terms used herein have the same meanings as commonly understood by those skilled in the technical field of the invention. The terms used in the specification of the invention are only for the purpose of describing specific embodiments. are not intended to limit the invention. As used herein, the term "and/or" includes any and all combinations of one or more related listed items.

Figure 1:
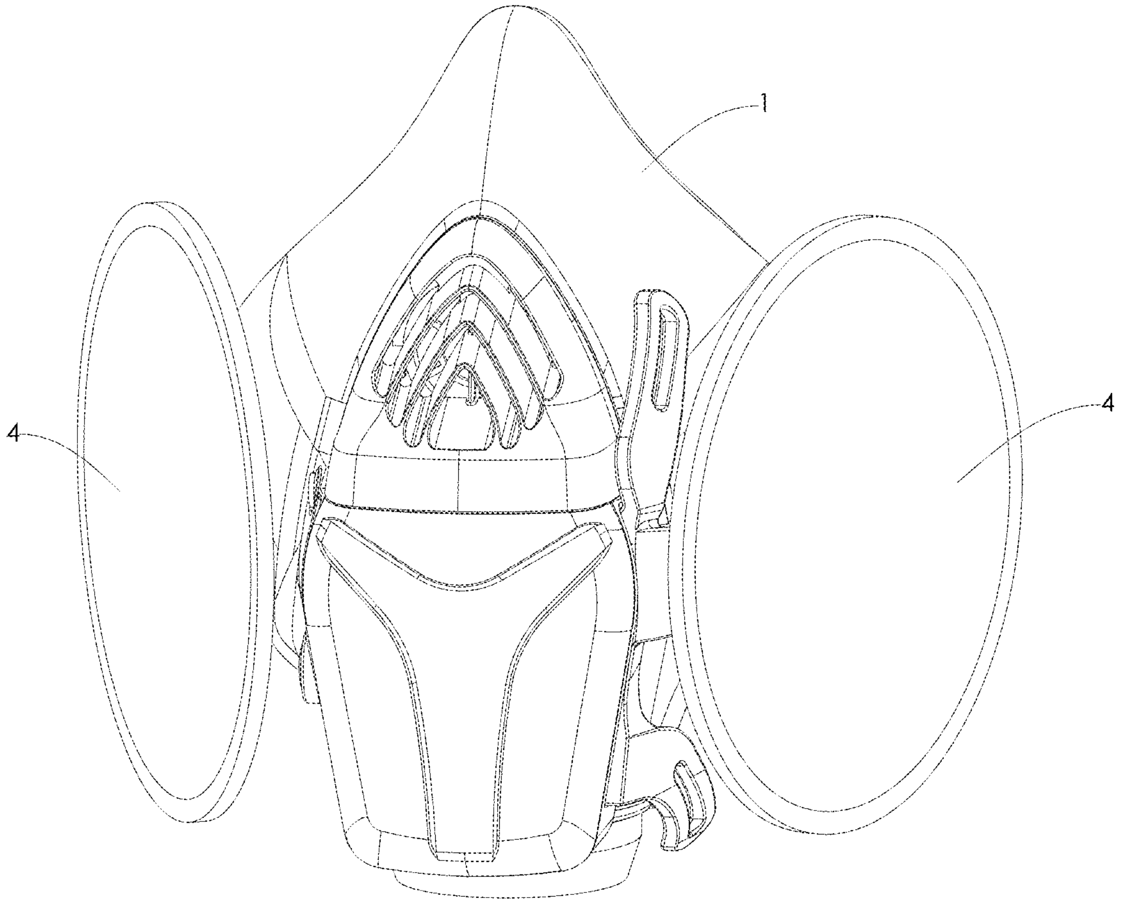
FIG. 1 is a front perspective view of an adaptive auxiliary air supply respirator according to an embodiment of the invention.
Figure 2:
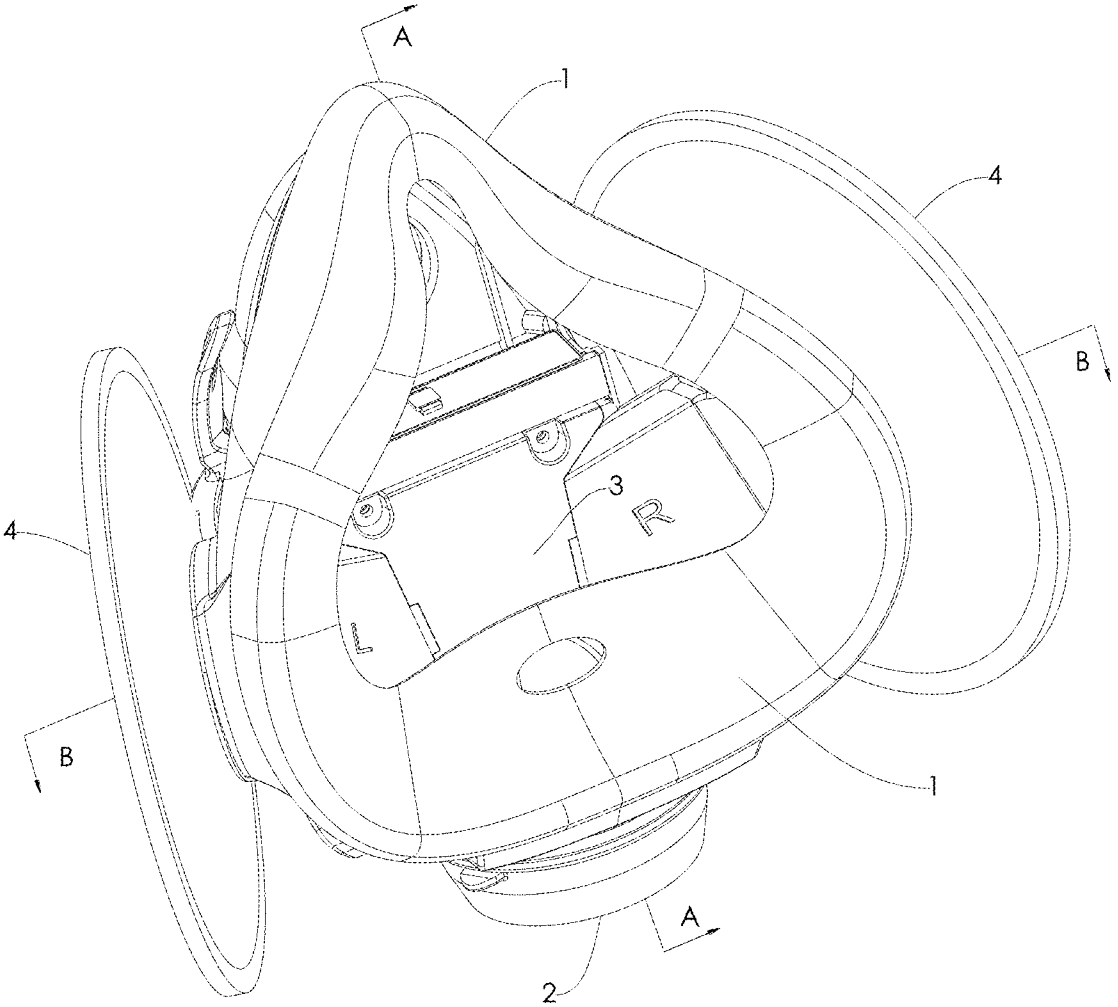
FIG. 2 is a rear perspective view of an adaptive auxiliary air supply respirator according to an embodiment of the invention.
Figure 3:
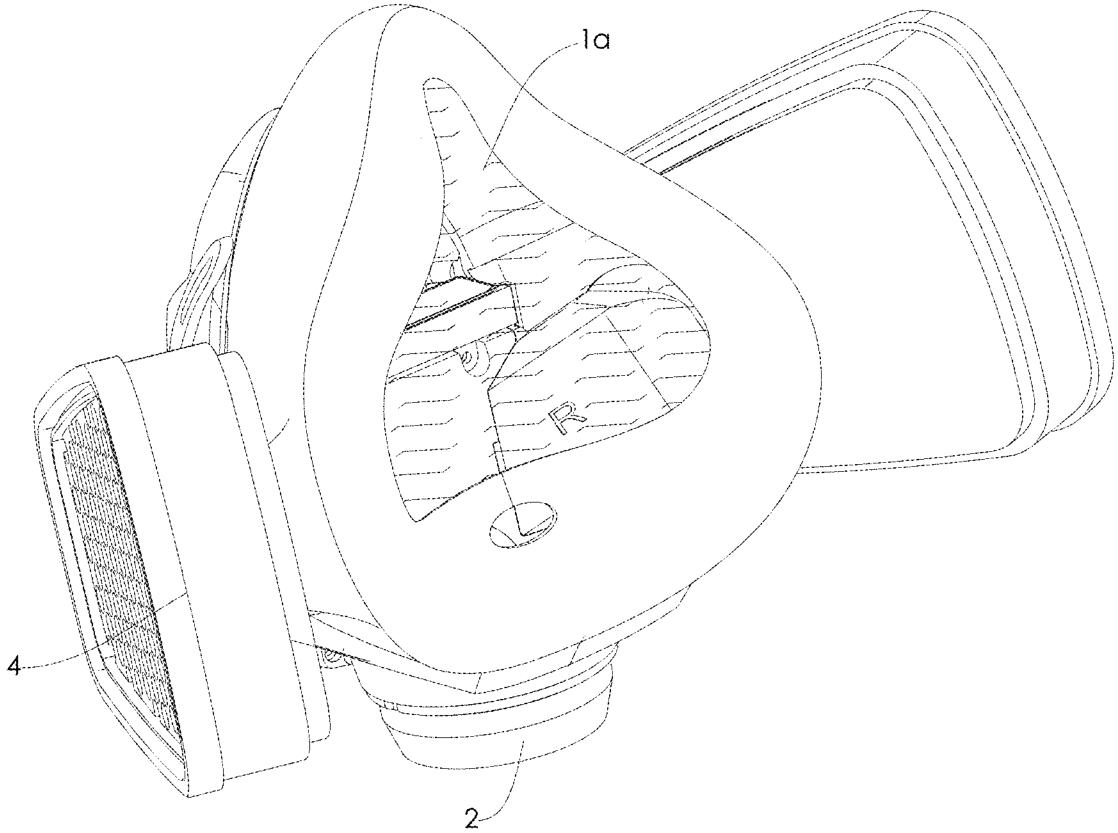
FIG. 3 is a structural diagram of an area where an internal chamber is located according to an embodiment of the invention.

An adaptive auxiliary air supply respirator shown in FIGS. 1-11 comprises a sealing face shield 1, an exhalation valve 2, an intake chamber 3, a filter 4, and an auxiliary air supply mechanism 5. As illustrated in FIGS. 1-3, the sealing face shield 1 covers at least the area of the mouth and nose, and an internal chamber 1*a* is formed within the sealing face shield 1. The structure of the internal chamber 1*a* is shown in FIG. 3, where a seal is formed by the contact between the sealing face shield 1 and the face of a user. In other words, in the embodiments of the invention, external air enters the internal chamber 1*a* solely through the filter 4. It should also be noted that in some embodiments of the invention, the sealing face shield 1 may take various forms; it may cover only the mouth and nose as described above, provide full coverage of the face, adopt a full helmet structure for headgear-style wear, or be designed similarly to protective clothing to cover the entire body.

Figure 4:
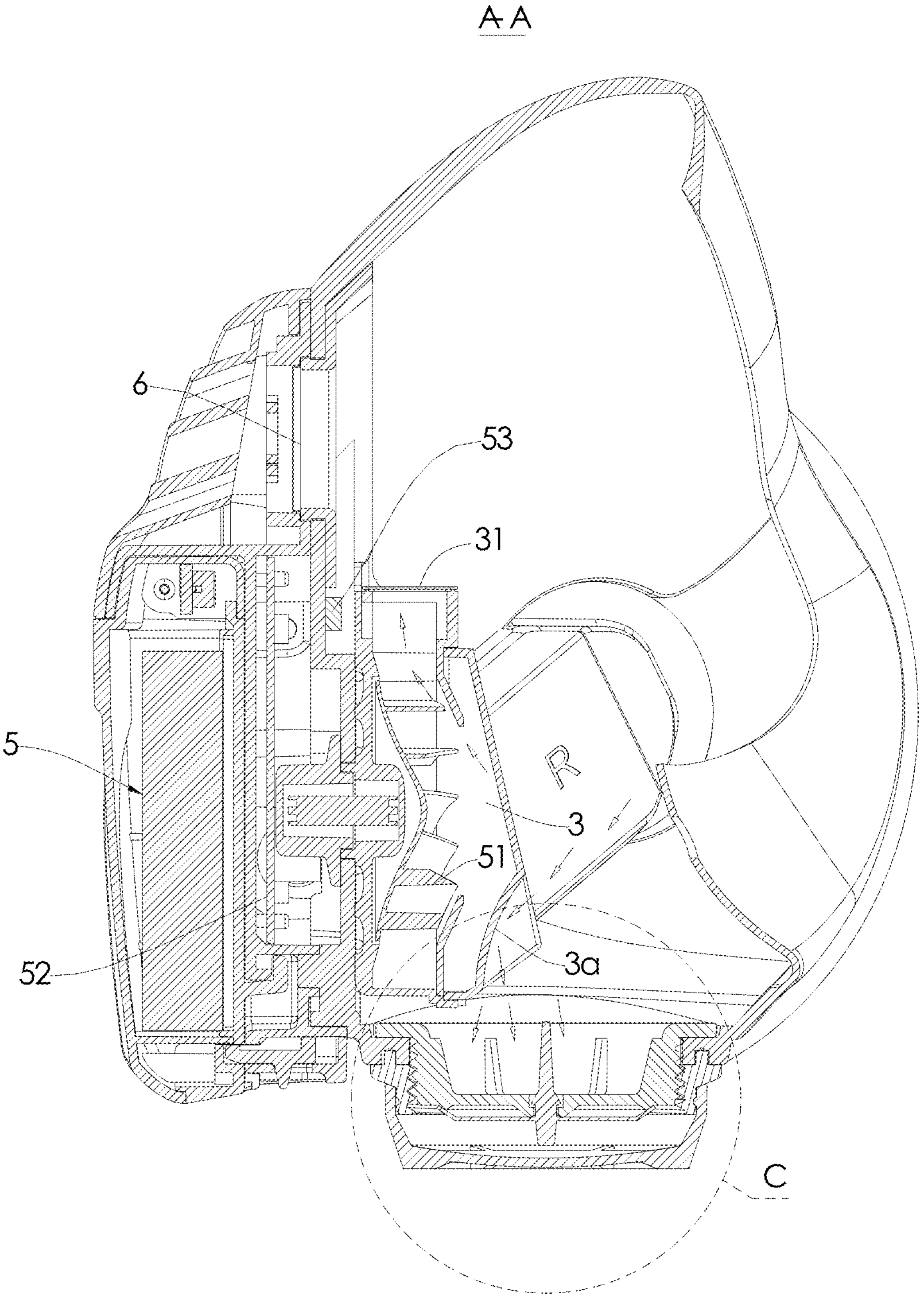
FIG. 4 is a cross-sectional view taken along line A-A in FIG. 2 according to an embodiment of the invention.
Figure 5:
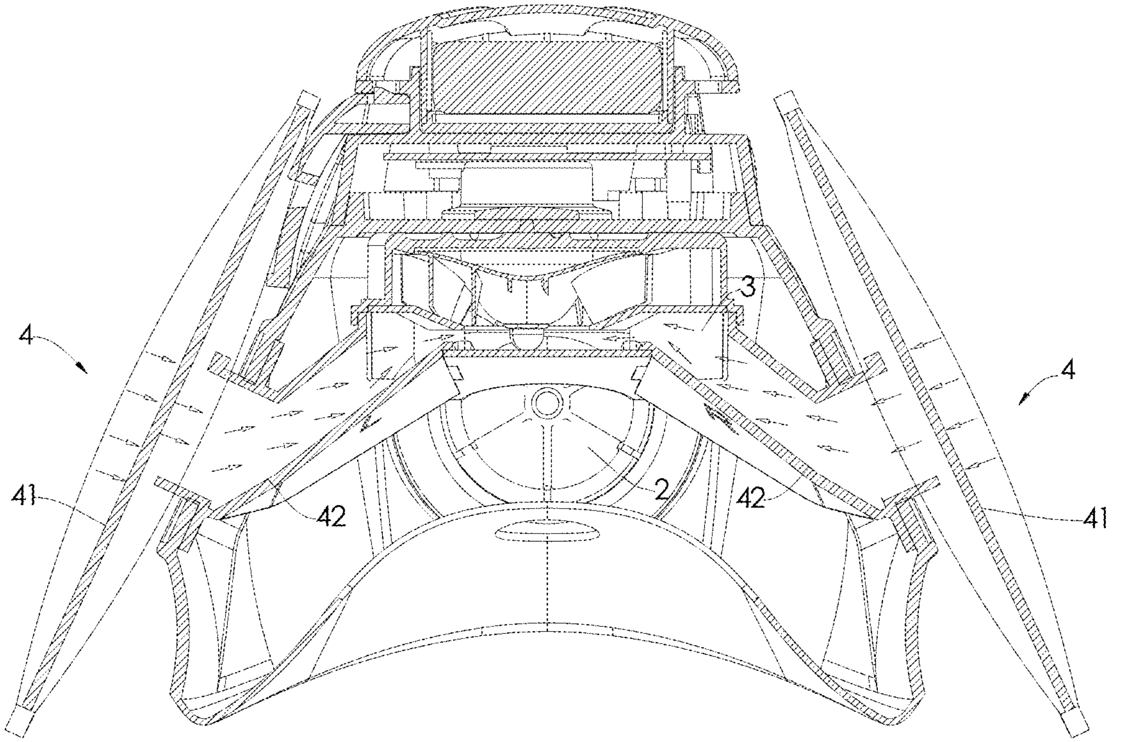
FIG. 5 is a cross-sectional view taken along line B-B in FIG. 2 according to an embodiment of the invention.
Figure 6:
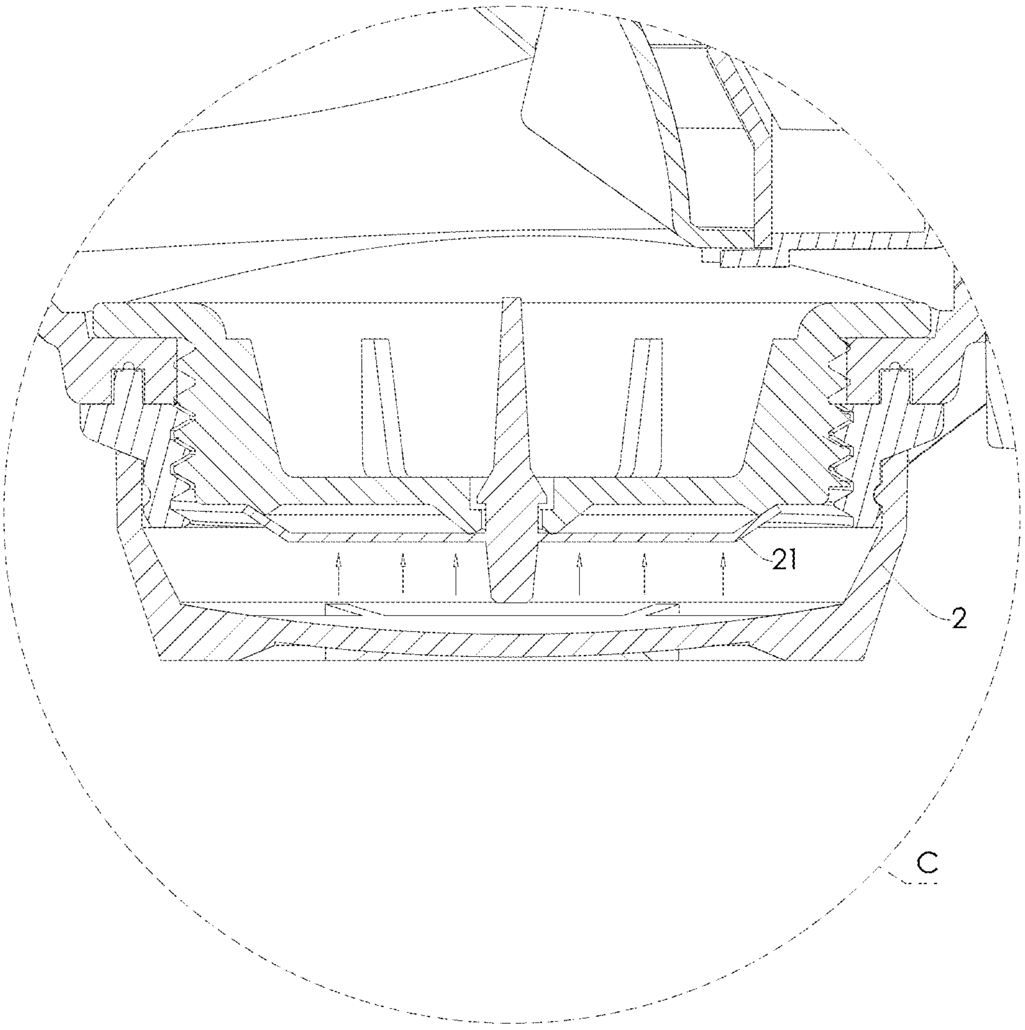
FIG. 6 is a partially enlarged view of point C in FIG. 4 according to an embodiment of the invention.
Figure 7:
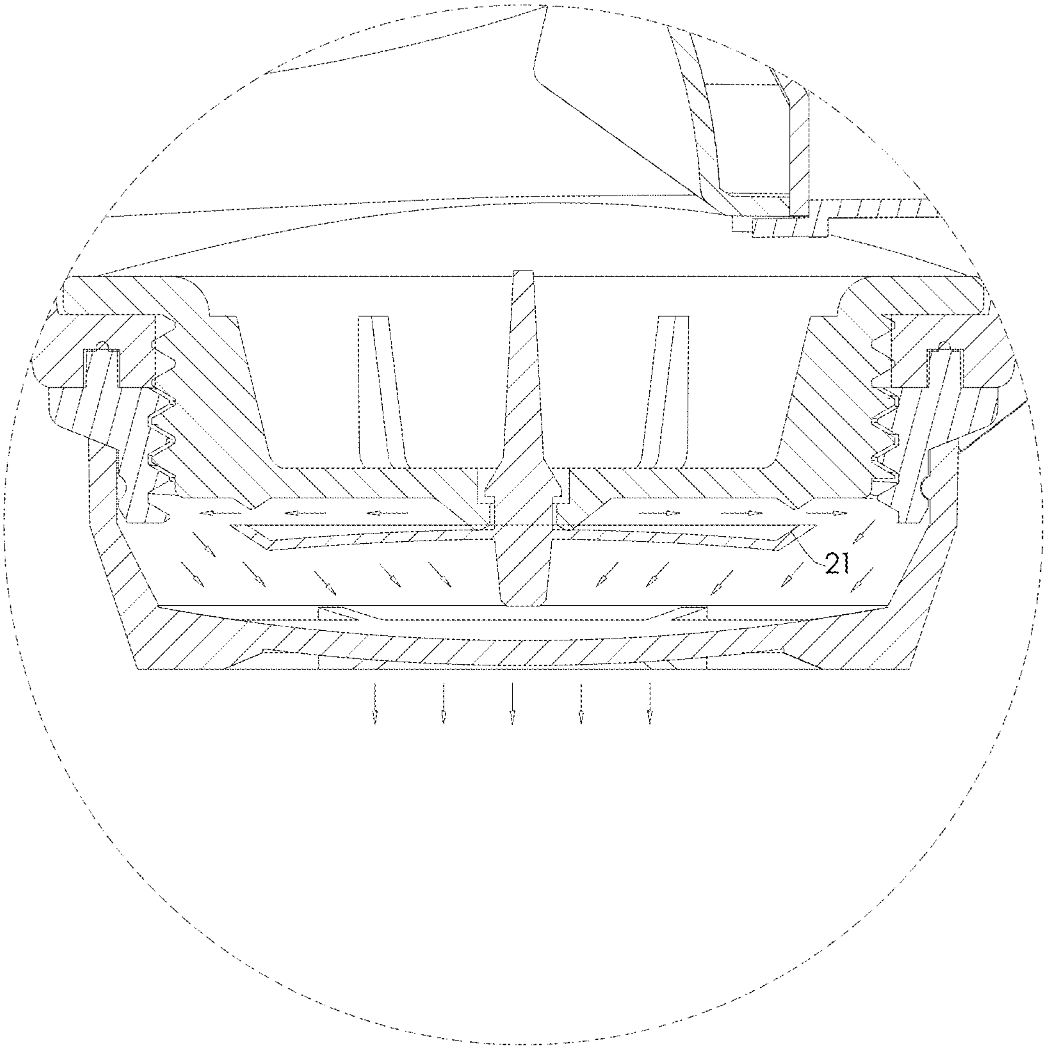
FIG. 7 is a diagram of a structure where an exhalation valve in FIG. 6 is open according to an embodiment of the invention.

As shown in FIGS. 4, 6, and 7, in the embodiments of the invention, the exhalation valve 2 is connected to the sealing face shield 1 and communicates with the internal chamber 1*a*. The exhalation valve 2 is configured to open unidirectionally during exhalation, allowing gas within the internal chamber 1*a* to be discharged through the exhalation valve 2. In the embodiments of the invention, the exhalation valve 2 is a one-way valve that communicates only with the outside of the sealing face shield 1. With this arrangement, when the user exhales, waste gas will be expelled through the exhalation valve 2. It should be noted that one-way valves in the prior art come in various structural forms, which can be chosen by those skilled in the art as needed. Therefore, the specific structural form of the exhalation valve 2 will not be elaborated upon here.

As shown in FIGS. 2 and 4, the intake chamber 3 is located inside the sealing face shield 1, and an inhalation valve 31 is installed on the intake chamber 3. The inhalation valve 31 is configured to open unidirectionally during inhalation, allowing gas from the intake chamber 3 to enter the internal chamber 1*a* through the inhalation valve 31. In the embodiments of the invention, the filter 4 is arranged on the sealing face shield 1 and communicates with the intake chamber 3. With this arrangement, external air enters the intake chamber 3 through the filter 4, and fresh air in the intake chamber 3 enters the internal chamber 1*a* through the inhalation valve 31. Thus, when the user inhales, the inhalation valve 31 opens unidirectionally, introducing fresh air from the intake chamber 3 into the internal chamber 1*a* for the user to breathe.

In the embodiments of the invention, as shown in FIG. 4, the auxiliary air supply mechanism 5 comprises a fan 51 extending into the intake chamber 3, a controller 52 for controlling a speed of the fan 51, and a sensor 53 arranged within the sealing face shield 1. The fan 51 is configured to transfer external air into the intake chamber 3. When the sensor 53 detects inhalation by the user, the controller 52 increases the speed of the fan 51. Conversely, when the sensor 53 detects exhalation, the controller 52 decreases the speed of the fan 51. It should also be noted that the sensor 53 may have various structural forms for detecting human respiration. For example, a pressure sensor 53 may be employed to monitor the pressure within the internal chamber 1*a* or a gas concentration sensor 53 is utilized to detect changes in CO2 concentration within the internal chamber 1*a*.

In the above embodiments of the invention, by arranging the exhalation valve 2 within the internal chamber 1*a* and the inhalation valve 31 on the intake chamber 3 within the internal chamber 1*a*, as well as the sensor 53, the controller 52 and the fan 51, the fan 51 accelerates during inhalation, allowing external air to enter the intake chamber 3 through the filter 4. Compared to the prior art, this design eliminates the need for continuous airflow while reducing the resistance to external air entering the sealing face shield 1, thereby decreasing user fatigue and enhancing the user experience.

Based on the aforementioned embodiments, still referring to FIGS. 4, 6, and 7, in the embodiments of the invention, the exhalation valve 2 is arranged at a bottom of the sealing face shield 1 and provided with a first valve flap 21 inside, which opens when the pressure exceeds a set value. The valve flap is positioned at a bottom of the exhalation valve 2, so that when the user inhales, the pressure in the internal chamber 1*a* decreases, keeping the first valve flap 21 closed. During exhalation, the first valve flap 21 opens under pressure. Moreover, by placing the exhalation valve 2 at the bottom of the sealing face shield 1, the structure enhances the discharge rate of CO2 exhaled by the user, thereby ensuring user safety.

Referring to FIG. 4, in some embodiments of the invention, the intake chamber 3 is arranged in the middle of the sealing face shield 1, and an outer wall of the intake chamber 3 features a guiding surface 3*a* directed towards the exhalation valve 2. It should be noted that in the embodiments of the invention, the middle of the sealing face shield 1 refers to the position directly in front within the interior of the sealing face shield 1. This arrangement allows for uniform air intake into the intake chamber 3. Further, by means of the guiding surface 3*a*, exhaled gas can be directed, causing the breath exhaled from the mouth to flow towards the exhalation valve 2 under the action of the guiding surface 3*a*. This increases the amount of waste gas expelled, thereby reducing the occurrence of accidents that may jeopardize user safety due to the increase of CO2 in the waste gas.

Figure 8:
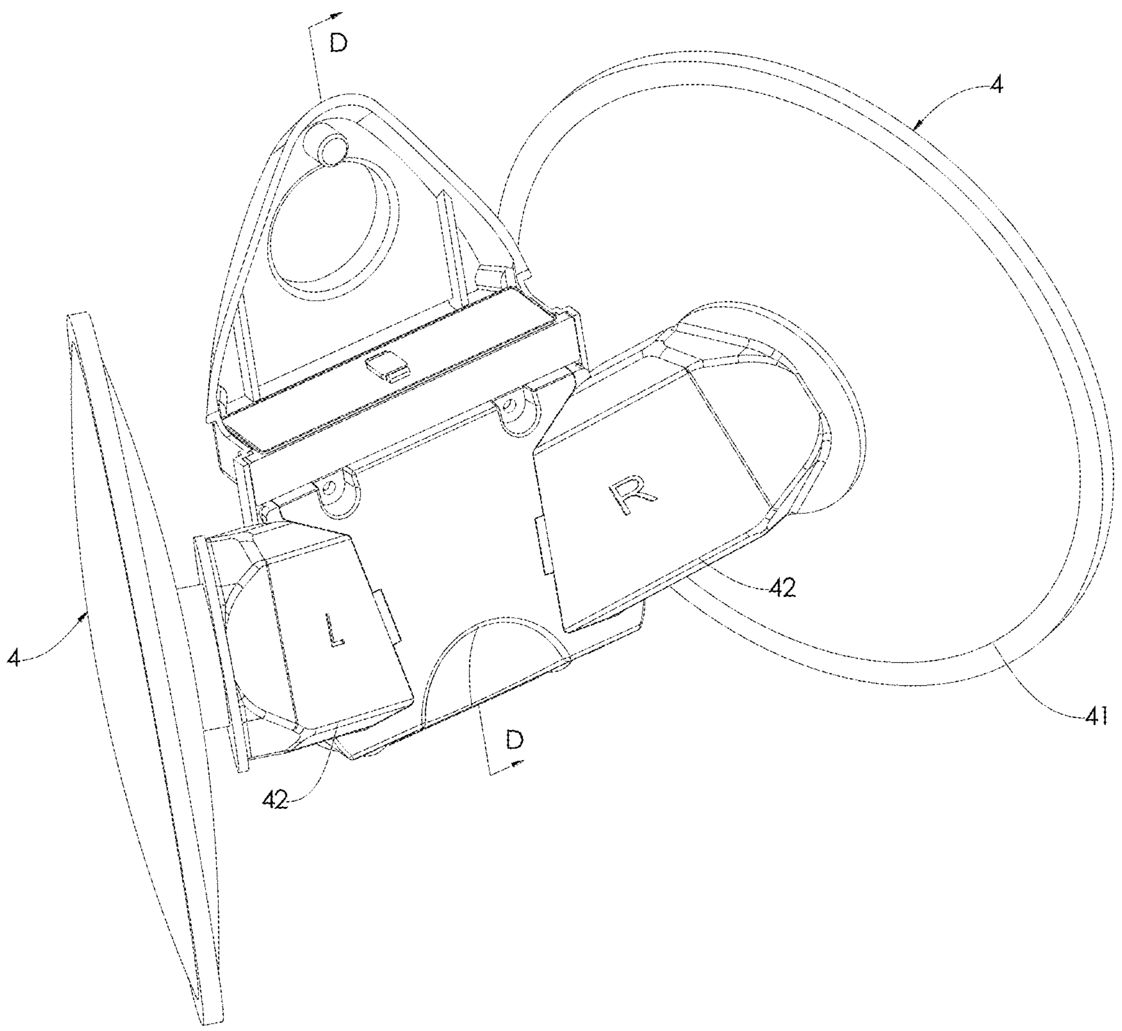
FIG. 8 is a structural diagram of the connection between an auxiliary air supply mechanism and a filter according to an embodiment of the invention.
Figure 9:
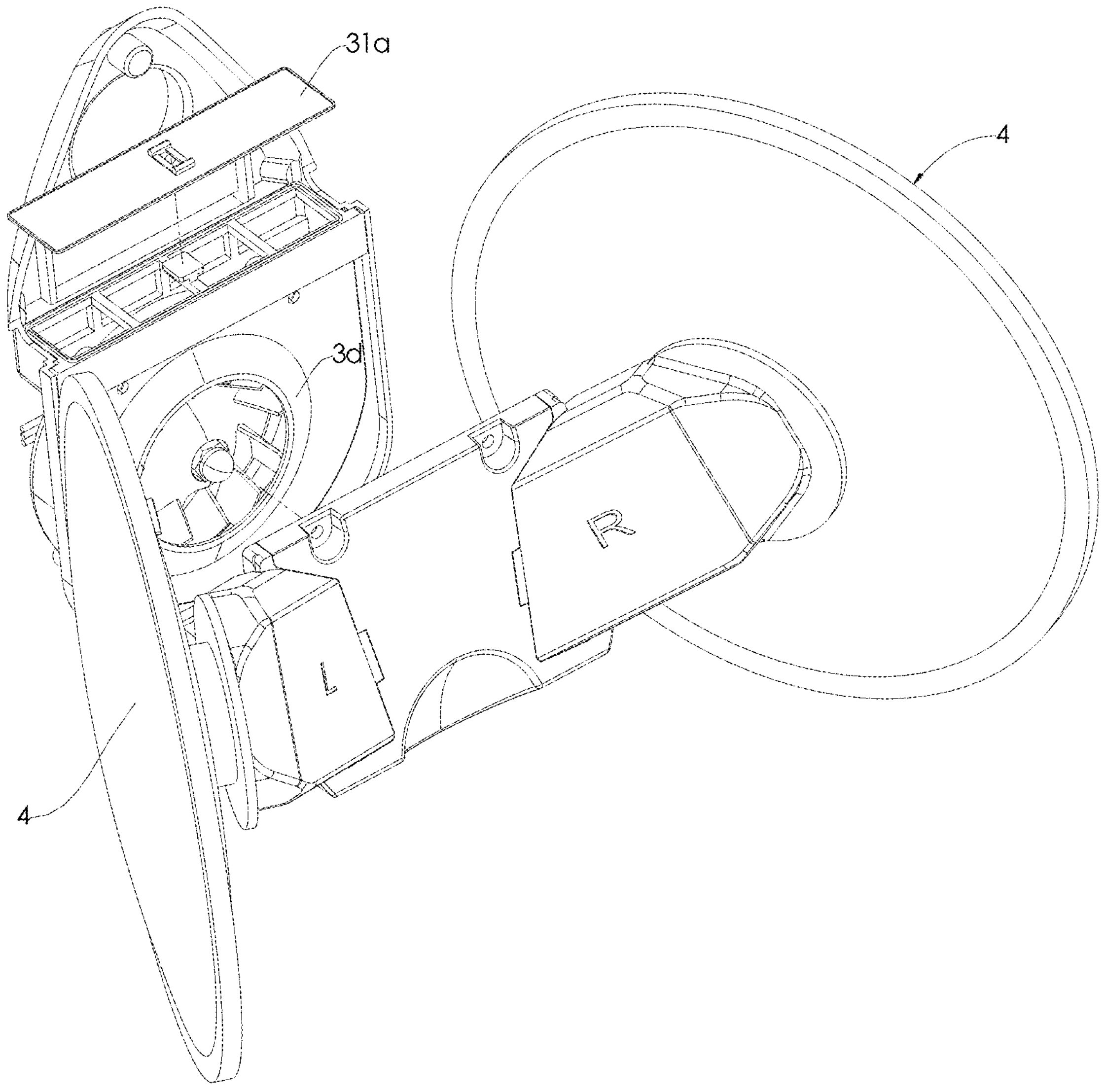
FIG. 9 is an explosive view of FIG. 8 according to an embodiment of the invention.
Figure 10:
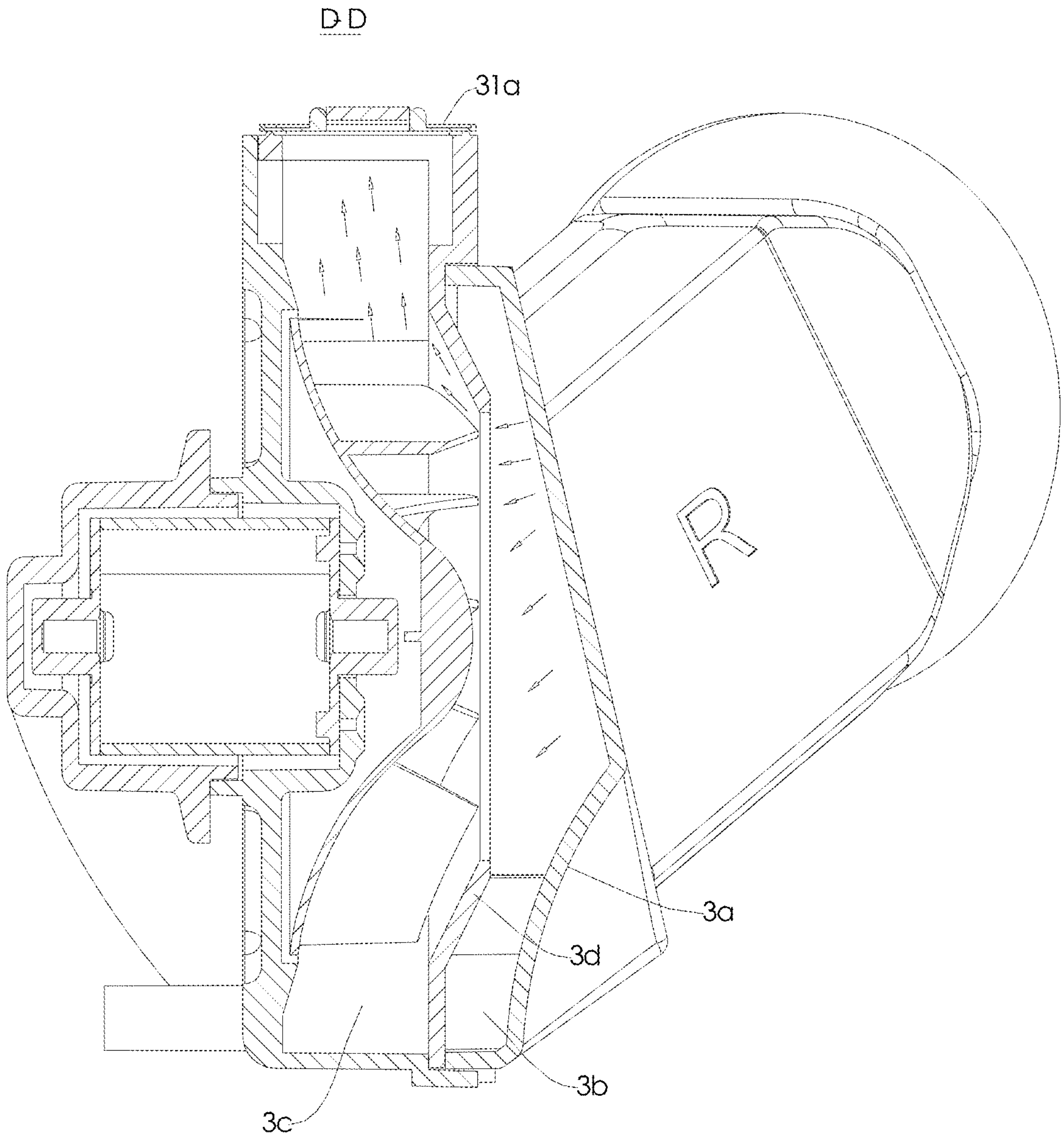
FIG. 10 is a cross-sectional view taken along line D-D in FIG. 8 according to an embodiment of the invention.

Regarding the specific structure of the intake chamber 3, as illustrated in FIGS. 8-10, in some embodiments of the invention, the intake chamber 3 comprises a front chamber 3*b* and a rear chamber 3*c*. The fan 51 is arranged in the rear chamber 3*c*, and the rear chamber 3*c* features an annular tapered wall 3*d* protruding towards the front chamber 3*b*. Blades of the fan 51 are arranged within the annular tapered wall 3*d*, and the annular tapered wall 3*d* communicates with the front chamber 3*b*. As shown in FIG. 10, with this arrangement, when the blades of the fan 51 rotate, gas in the rear chamber 3*c* is pushed towards the inhalation valve 31. At this point, the rotation of the fan causes the pressure in the rear chamber 3*c* to decrease, thereby drawing gas from the front chamber 3*b* into the rear chamber 3*c*. With this structural arrangement, it is only necessary to fix the blades of the fan 51 within the rear chamber 3*c*, allowing the motor to achieve sealing with the rear chamber 3*c*, thereby ensuring the sealing of the internal chamber 1*a*.

Regarding the specific structure of the filter 4, still referring to FIGS. 8-10, in some embodiments of the invention, the filter 4 comprises a filtering plate 41 located outside the sealing face shield 1 and a communication tube 42 communicating with the filtering plate 41 and the front chamber 3*b*.

In some embodiments of the invention, the area of the filtering plate 41 is larger than the cross-sectional area of the communication tube 42. This arrangement enhances the filtration efficiency while simultaneously reducing the resistance to air intake.

Figure 11:
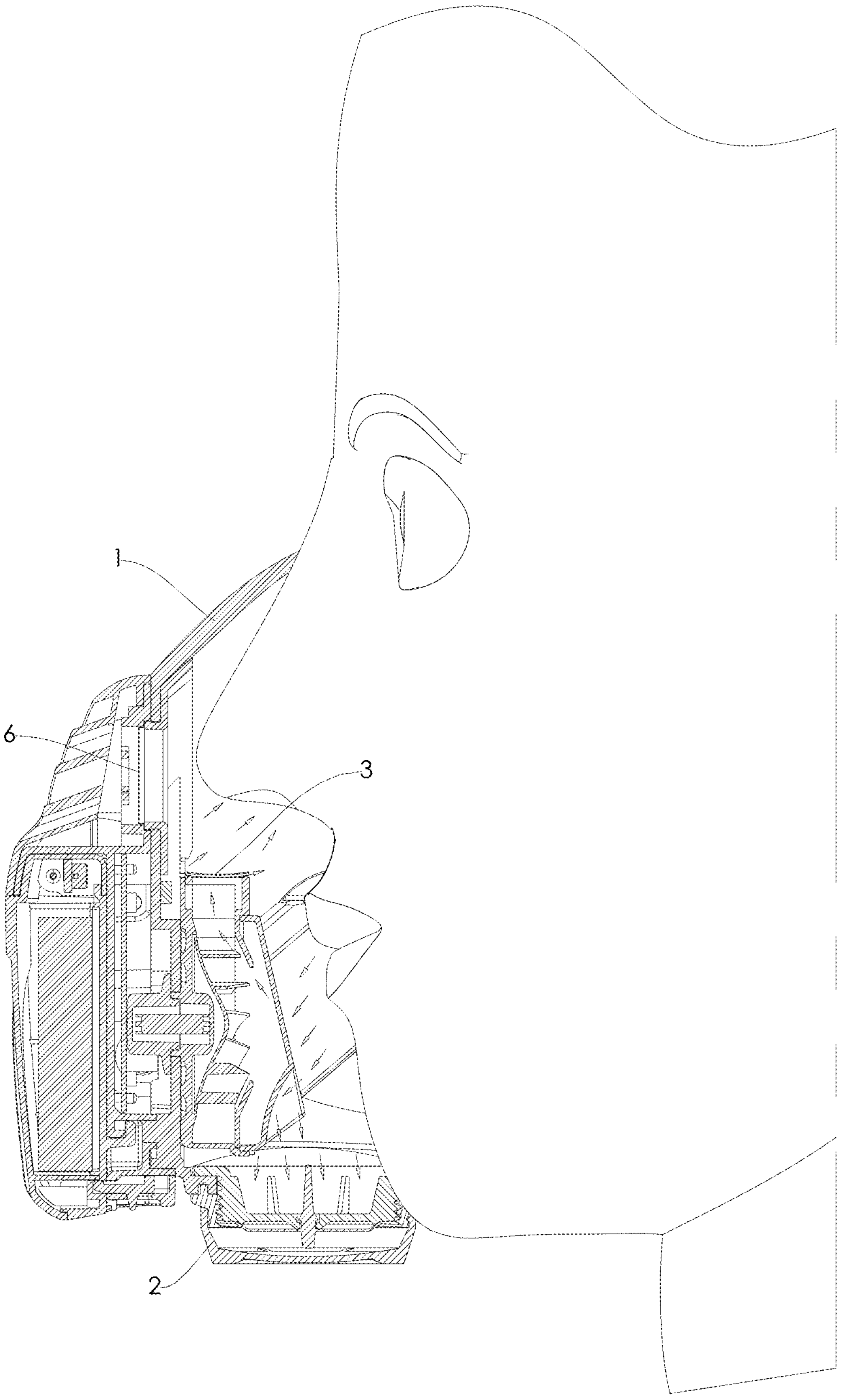
FIG. 11 is a cross-sectional view of an adaptive auxiliary air supply respirator when worn according to an embodiment of the invention.

Regarding the specific structure of the inhalation valve 31, as shown in FIGS. 9 and 10, the inhalation valve 31 is arranged at a top of the rear chamber 3*c* and comprises a second valve flap 31*a* with the center fixed and edges free. As depicted in FIG. 9, the edges of the second valve flap 31*a* overlap the top of the rear chamber 3*c*. This arrangement allows the edges of the second valve flap 31*a* to open during inhalation, while during exhalation, the increased pressure in the internal chamber 1*a* presses the edges of the second valve flap 31*a* against the top of the rear chamber 3*c*. To further ensure that the gas inhaled by the user is fresh and filtered, as shown in FIG. 11, in some embodiments of the invention, a height of the second valve flap 31*a* corresponds to an inhalation area where the nostrils of the user are located. Thus, when inhaling, the user breathes through the nose, causing the second valve flap 31*a* to open, allowing gas from the intake chamber 3 to enter the nasal chamber of the user. During exhalation, the exhaled gas is directed by the guiding surface 3*a* on the outer wall of the front chamber 3*b* to the lower exhalation valve 2 for expulsion. This configuration ensures that fresh air is inhaled while waste gas is expelled, thereby guaranteeing user safety and comfort.

In some embodiments of the invention, since the internal chamber 1*a* is a sealed space, the sealing face shield 1 is also equipped with a sound transmission membrane 6 to reduce barriers to communication with the outside world, as shown in FIGS. 4 and 11. In the embodiments of the invention, the sound transmission membrane 6 is fixed in a hollowed-out hole of the sealing face shield 1, thus preventing external air from entering and ensuring the airtightness of the sealing face shield 1. At the same time, the vibration of the sound transmission membrane 6 can transmit the voice of the user, further alleviating communication difficulties for the user during use.

Figure 12:
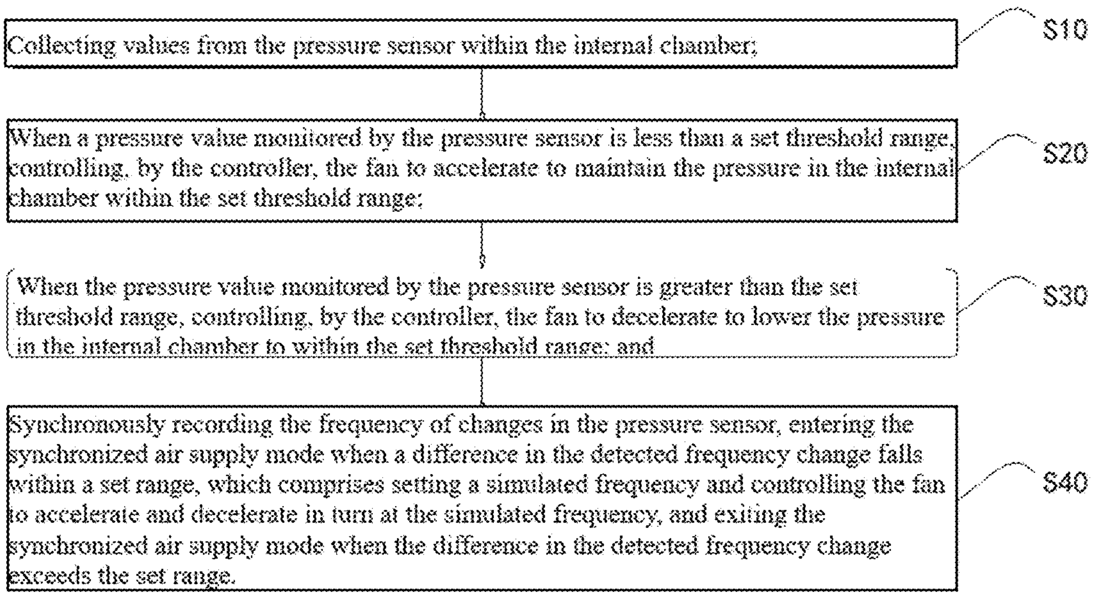
FIG. 12 is a flowchart of a control method of an adaptive auxiliary air supply respirator according to an embodiment of the invention.

In some embodiments of the invention, the sensor 53 for detecting user respiration is a pressure sensor 53, and the controller 52 adjusts the speed of the fan 51 based on the pressure changes monitored by the sensor 53. Specifically, referring to FIG. 12, a control method of an adaptive auxiliary air supply respirator according to an embodiment of the invention comprises the following steps:

S10, collecting values from the pressure sensor 53 within the internal chamber 1*a*; here, the pressure sensor 53 is electrically connected with the controller 52;

S20, when a pressure value monitored by the pressure sensor 53 is less than a set threshold range, controlling, by the controller 52, the fan 51 to accelerate to maintain the pressure in the internal chamber 1a within the set threshold range; here, when a pressure below the set value is detected, it indicates that the user is inhaling, causing the pressure in the internal chamber 1a to decrease, and by controlling the fan 51 to accelerate, external air can be drawn through the filter 4 into the intake chamber 3 and subsequently into the internal chamber 1*a;*

S30, when the pressure value monitored by the pressure sensor 53 is greater than the set threshold range, controlling, by the controller 52, the fan to decelerate to lower the pressure in the internal chamber 1*a* to within the set threshold range; here, when an increase in pressure is detected, it indicates that the user is exhaling, causing the pressure in the internal chamber 1*a* to increase, and by reducing the speed of the fan 51, the opening of the inhalation valve 31 can be prevented, allowing the exhaled gas to exit through the exhalation valve 2;

however, the inventors found that the adjustment of the speed of the fan 51 is based on changes in pressure, resulting in a certain degree of lag; this means that there is still some resistance at the initial stages of inhalation and exhalation; to further enhance user comfort, some embodiments of the invention also incorporate a synchronized air supply mode, as detailed in S40;

S40, synchronously recording the frequency of changes in the pressure sensor 53, entering the synchronized air supply mode when a difference in the detected frequency change falls within a set range, which comprises setting a simulated frequency and controlling the fan 51 to accelerate and decelerate in turn at the simulated frequency, and exiting the synchronized air supply mode when the difference in the detected frequency change exceeds the set range. It should be noted that by recording the frequency of pressure changes, the respiratory rate of a user is determined. When the respiration becomes stable, the respiratory rate remains nearly constant. The frequency difference may be set by those skilled in the art as needed. Once stability is achieved, the system sets a frequency value equal to the stable frequency, and then adjusts the speed of the fan 51 based on the frequency value. This means that the adjustment of the fan 51 occurs in synchronization with the respiration of the user. This setup eliminates the system delay of the pressure sensor 53, allowing the speed adjustment of the fan 51 to be in sync with the respiration of the user, thus avoiding the sensation of lag during use and making the experience smoother.

Those skilled in the art should understand that the invention is not limited by the above-mentioned embodiments. What is described in the above-mentioned embodiments and the description is only to illustrate the principles of the invention. Without departing from the spirit and scope of the invention, the invention will have various changes and improvements, which all fall within the scope of the claimed invention. The protection scope of the invention is defined by the appended claims and their equivalents.

What is claimed is:

1. A control method of an adaptive auxiliary air supply respirator, wherein the adaptive auxiliary air supply respirator comprises:

a sealing face shield configured to cover at least the area of the mouth and nose of a user, an internal chamber being formed within the sealing face shield;

an exhalation valve connected to the sealing face shield, communicating with the internal chamber, and configured to open unidirectionally during exhalation, allowing gas from the internal chamber to be discharged through the exhalation valve;

an intake chamber located inside the sealing face shield and equipped with an inhalation valve which opens unidirectionally during inhalation, allowing the gas in the intake chamber to enter the internal chamber from the inhalation valve;

a filter mounted on the sealing face shield and communicating with the intake chamber; and an auxiliary air supply mechanism comprising a fan extending into the intake chamber, a controller for controlling a speed of the fan, and a pressure sensor arranged inside the sealing face shield;

the fan is configured to transfer the gas into the intake chamber; when the pressure sensor detects the inhalation, the controller increases the speed of the fan; when the pressure sensor detects the exhalation, the controller decreases the speed of the fan;

the exhalation valve is positioned at a bottom of the sealing face shield and provided with a first valve flap inside which opens when a pressure exceeds a set value;

the intake chamber is arranged in a middle of the sealing face shield, with a guiding surface on an outer wall of the intake chamber directed towards the exhalation valve, and the guiding surface directs the gas towards the exhalation valve;

the intake chamber comprises a front chamber and a rear chamber, with the fan located inside the rear chamber, the rear chamber features an annular tapered wall protruding towards the front chamber, blades of the fan are positioned within the annular tapered wall, and the annular tapered wall communicates with the front chamber;

the filter comprises a filtering plate located outside the sealing face shield and a communication tube communicating with the filtering plate and the front chamber; and the inhalation valve is arranged at a top of the rear chamber and comprises a second valve flap with a center fixed and edges free;

a height of the second valve flap corresponds to an inhalation area where the nostrils of the user are located, and the guiding surface directs the gas towards the exhalation valve;

the control method comprises the following steps:

collecting pressure values from the pressure sensor within the internal chamber;

when one of the pressure values monitored by the pressure sensor is less than a set threshold range, controlling, by the controller, the fan to accelerate to maintain the pressure in the internal chamber within the set threshold range;

when one of the pressure values monitored by the pressure sensor is greater than the set threshold range, controlling, by the controller, the fan to decelerate to lower the pressure in the internal chamber to within the set threshold range; and synchronously recording a frequency of changes in the pressure sensor; by recording the frequency of pressure changes, a respiratory rate of the user is determined; the controller sets a frequency value equal to the respiratory rate of the user and adjusts the speed of the fan according to the frequency value; when a difference in the detected frequency change falls within a set range, the controller enters a synchronized air supply mode, which comprises setting a simulated frequency and controlling the fan to accelerate and decelerate in turn at the simulated frequency; when the difference in the detected frequency change exceeds the set range, the controller exits the synchronized air supply mode.

2. The control method of the adaptive auxiliary air supply respirator according to claim 1, wherein the sealing face shield is also equipped with a sound transmission membrane.

* * * * *